United States Patent [19]
Omdahl

[11] Patent Number: 5,528,858
[45] Date of Patent: Jun. 25, 1996

[54] ANIMAL BARRIER AND METHOD

[76] Inventor: Debra Omdahl, 45850 Via Vaquero Rd., Temecula, Calif. 92590

[21] Appl. No.: 331,972

[22] Filed: Oct. 31, 1994

[51] Int. Cl.$^6$ .......................... A01G 17/00; A01M 29/00
[52] U.S. Cl. ...................................... 47/84; 47/25; 52/101
[58] Field of Search ........................... 47/25, 84 C, 29 R; 52/161

[56] References Cited

U.S. PATENT DOCUMENTS

| | | | |
|---|---|---|---|
| 1,453,810 | 5/1923 | Sleen | 47/25 |
| 2,142,371 | 1/1939 | Peles | 52/101 |
| 2,263,874 | 11/1941 | Hilleman | 47/25 |
| 2,456,731 | 12/1948 | Peles | 52/101 |
| 2,888,716 | 6/1959 | Kaufmann | 52/101 |
| 3,407,550 | 10/1968 | Shaw | 52/101 |
| 4,431,166 | 2/1984 | Marshall | 47/25 |
| 5,355,623 | 10/1994 | Brown | 47/84 C |

FOREIGN PATENT DOCUMENTS

| | | | |
|---|---|---|---|
| 2249013 | 4/1992 | United Kingdom | 47/25 |

OTHER PUBLICATIONS

Nixalite, Sweet's Catalog Service 1955 p. 20–1E; 5i/Ni 8 pages.

*Primary Examiner*—Henry E. Raduazo
*Attorney, Agent, or Firm*—Calif Tervo

[57] ABSTRACT

An animal barrier generally comprises a substantially open, substantially rigid grid, such as of wire, and a plurality of spikes of various lengths, heights and angles connected to the grid and projecting upward therefrom. In a preferred embodiment, the grid has a slit from its periphery inward for placing the grid around said stem of a plant, long spikes are at substantially right angles to the grid and slanted spikes are between 45° and 80° to the grid. The method of making an animal barrier from a grid of transverse and longitudinal wires joined at their intersections comprises the steps of severing a traverse wire adjacent each side of a first intersection, severing the longitudinal wire that is at the first intersection between the first intersection and an adjacent intersection in a first direction, bending the severed traverse wires upward from their adjacent intersections, and bending the severed longitudinal wire upward from the intersection adjacent the first intersection in a second direction opposite the first direction.

4 Claims, 1 Drawing Sheet

U.S. Patent     Jun. 25, 1996     5,528,858
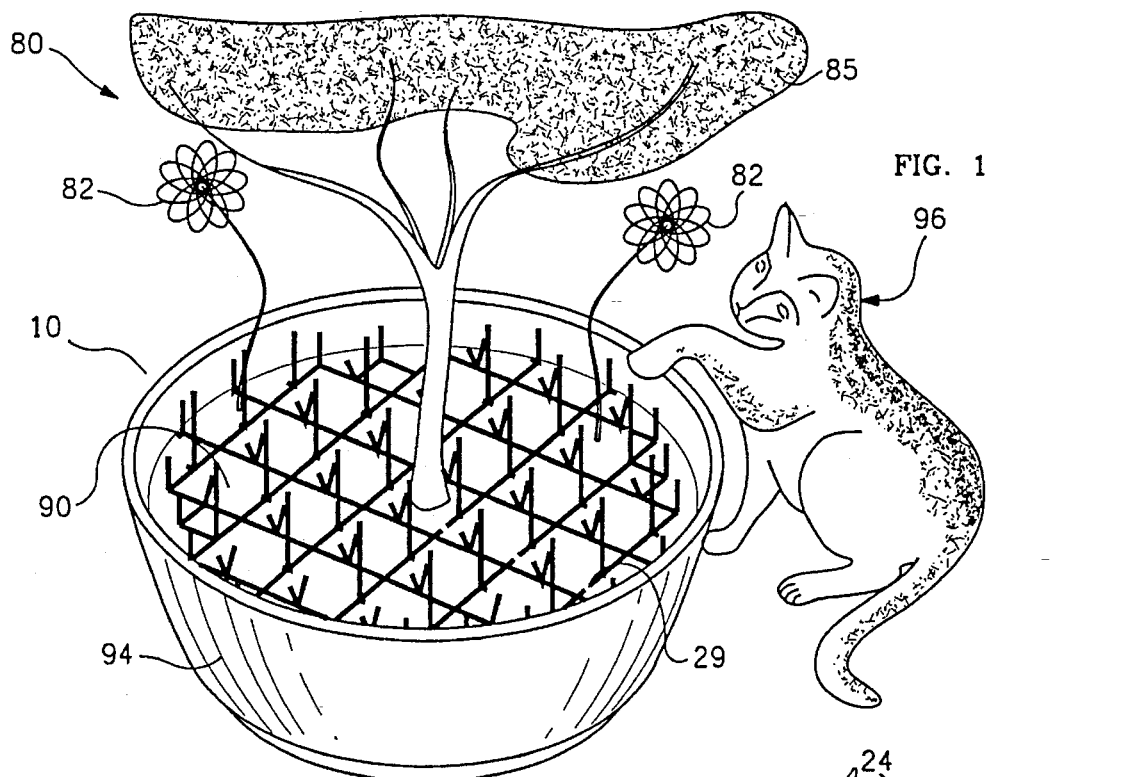
FIG. 1
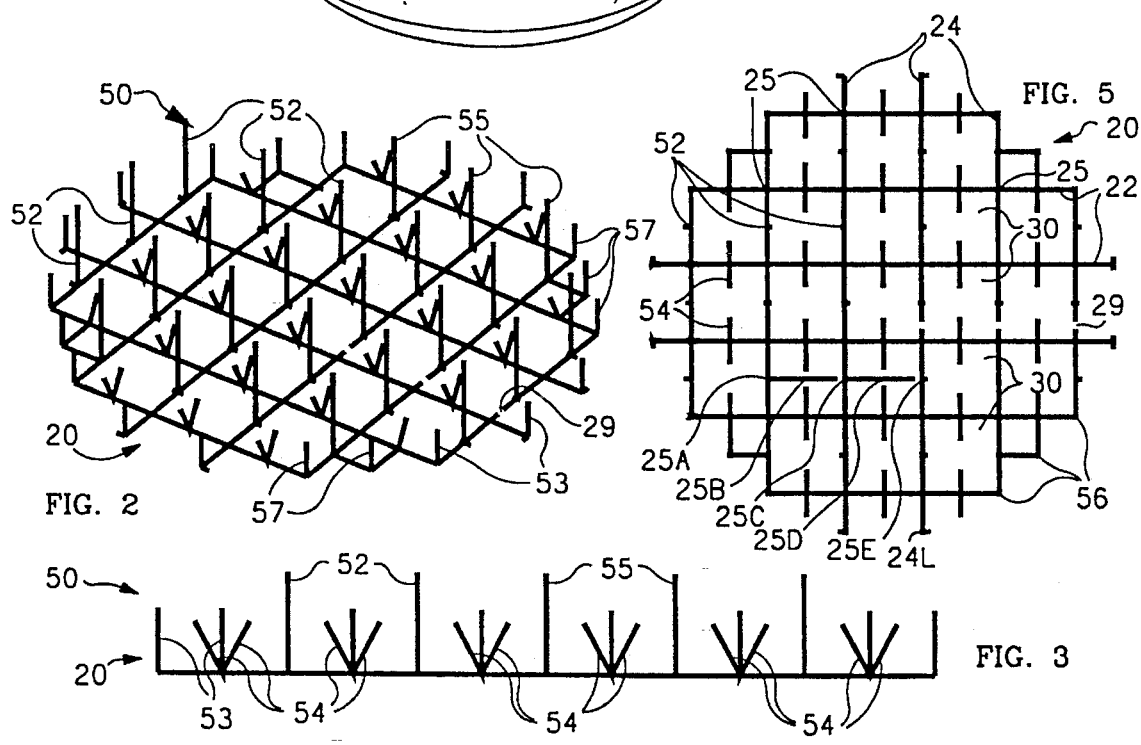
FIG. 2
FIG. 5
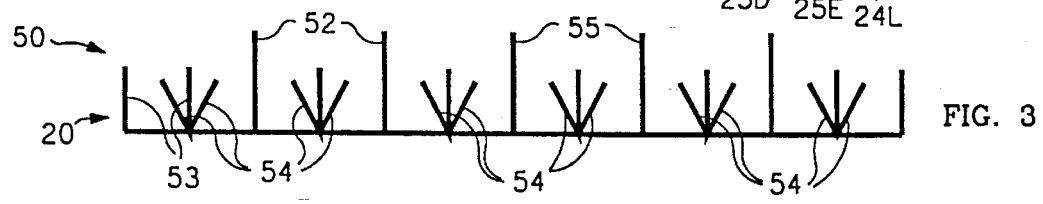
FIG. 3
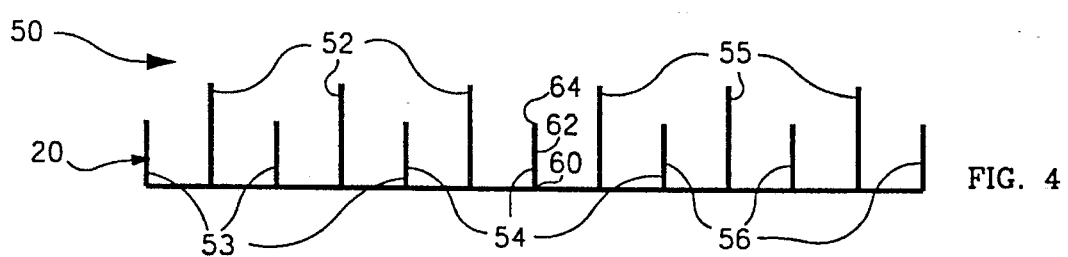
FIG. 4

ANIMAL BARRIER AND METHOD

BACKGROUND OF THE INVENTION

FIELD OF THE INVENTION

This invention relates to physical barriers to keep animals from an area and, more specifically, to a deterrent barrier to keep pets, such as cats, from digging in soil containing plants.

BACKGROUND OF THE INVENTION

Animals often go into areas where they are not wanted. A cat's behavior around the home may be particularly troublesome. For example, a cat may eat garden or house plants. Also, a cat may use any available soil, even an inside planter, as a latrine. This produces undesirable results: plants are dug up and killed, dirt is spread around the house, and undesirable waste and resulting odors are present.

Various methods have been tried to prevent this behavior. Substances noxious to cats, for example, peppers and chili peppers, have been spread on the soil. Devices delivering electrical shocks have been installed. Fences of various designs have been used. The previous methods have not proved satisfactory in one or more respects. Some methods are not very effective, some are too expensive, and some prevent easy personal access to the soil for care, such as watering and weeding.

Consequently, it has been desirable to have an improved animal barrier, particularly for covering soil containing plants.

SUMMARY OF THE INVENTION

This invention is an animal barrier and it generally comprises a substantially open, substantially rigid grid of wire or other material, such as plastic, and a plurality of spikes of various lengths, heights and angles connected to the grid and projecting upward therefrom. In a preferred embodiment, the grid has a slit from its periphery inward for placing the grid around said stem of a plant, long spikes are at substantially right angles to the grid and slanted spikes are between 45° and 80° to the grid.

The method of making an animal barrier from a grid of transverse and longitudinal wires joined at their intersections comprises the steps of severing a traverse wire adjacent each side of a first intersection, severing the longitudinal wire that is at the first intersection between the first intersection and an adjacent intersection in a first direction, bending the severed traverse wires upward from their adjacent intersections, and bending the severed longitudinal wire upward from the intersection adjacent the first intersection in a second direction opposite the first direction.

Other features and many attendant advantages of the invention will become more apparent upon a reading of the following detailed description together with the drawings in which like reference numerals refer to like parts throughout.

BRIEF DESCRIPTION OF THE DRAWINGS

FIG. 1 is a perspective view of a preferred embodiment of the invention.

FIG. 2 is a top perspective view of the embodiment of the animal barrier of FIG. 1.

FIG. 3 is a front plan view of the animal barrier of FIG. 2.

FIG. 4 is a right side view of the animal barrier of FIG. 2.

FIG. 5 is a top view of a wire grid out of which the animal barrier is made.

DETAILED DESCRIPTION OF THE INVENTION

With reference now to the drawings, and more particularly to FIG. 1 thereof, there is shown a preferred embodiment of an animal barrier, denoted generally as 10, according to the invention. Barrier 10 is shown placed on or above soil 90 that is contained in planter 94. Plants 80, such as flowers 82 and shrub 85, growing in soil 90, project upward through openings 30 in barrier 10. Cat 96 observes barrier 10.

Animal barrier 10 is best described with respect to FIGS. 2–4. FIG. 2 is a top perspective view of the animal barrier 10 of FIG. 1 shown removed from planter 94. FIG. 3 is a front plan view of the animal barrier 10 of FIG. 2. FIG. 4 is a right side view of the animal barrier 10 of FIG. 2.

Animal barrier 10 generally comprises a grid 20 and a plurality of spikes, denoted generally as 50, connected to grid 20 and projecting upward therefrom.

Grid 20 rigidly supports spikes 50 so as to protect plants 80 and soil 90 from cat 96. Openings 30 in grid 20 allow plants 80 to freely grow in soil 90. To these ends, grid 20 is substantially open and substantially rigid. Grid 20 has a slit 29 from its periphery inward for placing grid 20 around the stem 86 of shrub 85.

Grid 20 supports a field of spikes 50. Each spike 50 has a bottom end 60 connected to grid 20, a longitudinal portion 62 extending upward from bottom end, and a free end 64 supported above grid 20 by longitudinal portion 62. A plurality of spikes 50 are designated long spikes 52 and have longer longitudinal portions than a plurality of spikes designated as short spikes 53. A plurality of spikes 50, designated as angled spikes 54, have angled or slanted longitudinal sections. A plurality of spikes are designated high spikes 55 and have a higher free end than a plurality of spikes designated low spikes 56. In the embodiment shown, long spikes 52 and high spikes 55 are the same spikes.

After much experimentation, the barrier 10 of the invention was arrived at. It was found that if spikes are all of the same height, a cat is able to discern the location of the spikes and can walk through them. It was found that if spikes are all vertical, even if they are at different heights, some cats can discern the locations and maneuver through the spikes. Eventually, it was found that a field of spikes varying in both height and angle deter a cat. It is assumed that the combination is just too complicated for a cat to comprehend. At least from observation, a cat is annoyed at this degree of complicity and will not even waste much of its valuable time trying to figure it out.

FIG. 5 is a top view illustrating a preferred method of making barrier 10. Grid 20 is made from a framework of transverse wires 22 and longitudinal wires 24 joined, such as by welding, at their intersections 25. Transverse 22 and longitudinal 24 wires do not have to cross at right angles for the method to work. Grid 20, of the preferred embodiment, is made from sixteen gauge, galvanized steel welded wire having one-inch square openings 30. If consecutive intersections 25 along a given longitudinal wire 24L are designated first 25A, second 25B, third 25C, fourth 25D and fifth 25E intersections, then the traverse wires 22 at second 25B and fourth 25D intersections are severed adjacent the intersections on both sides. Longitudinal wire 22L is severed just before the third 25C and fifth 25E intersections. The severed traverse wires are bent upward from their adjacent intersections to an angle of 45° to 80° to form four short slanted spikes. The severed longitudinal wires are bent upward to substantially a right angle from the first 25A and third 25C intersections to form two long high straight spikes. This process can be repeated over the welded wire pattern. As shown in the embodiment of FIGS. 1–4, near the periphery of the welded wire, the pattern may be altered to provide for periphery spikes 57, such as short straight spikes shown. Of course, the cutting and bending and forming of the entire barrier form a piece of welded wire can be done by a machine with a single stroke, such as by using a die in a press. Barrier 10 may be painted a color, such as green, so as to be unobtrusive.

Preferably, spikes 50 are sufficiently rigid so as to not bend under the weight of a small animal such as a cat or dog but may be bendable by hand so that a person bend them out of the way and back again as desired for horticulture.

Having described the invention, it can be seen that it provides a very convenient an inexpensive device for keeping cats away from areas.

Although a particular embodiment of the invention has been illustrated and described, various changes may be made in the form, composition, construction, and arrangement of the parts without sacrificing any of its advantages. Therefore, it is to be understood that all matter herein is to be interpreted as illustrative and not in any limiting sense, and it is intended to cover in the appended claims such modifications as come within the true spirit and scope of the invention.

I claim:

1. In combination:

a planter;

soil in said planter; said soil having a periphery;

a plant growing in said soil and having a stem projecting upward from said soil; said plant being disposed away from said periphery of said soil;

an animal barrier comprising:

a substantially open, substantially rigid grid covering said soil; said grid having a periphery; said grid having a slit from said periphery of said grid inward for placing said grid around said stem of said plant; and a plurality of spikes connected to said grid and projecting upward therefrom; each spike having:

a bottom end connected to said grid;

a longitudinal portion extending upward from said bottom end; and a free end supported above said grid by said longitudinal portion; a plurality of said spikes being long spikes having longer longitudinal portions than a plurality of said spikes being short spikes; a plurality of said spikes being slanted spikes having angled longitudinal sections; and a plurality of said spikes being high spikes having a higher free end than a plurality of said spikes being short spikes.

2. The combination of claim 1 wherein:

said long spikes are at substantially right angles to said grid.

3. The combination of claim 1 wherein said slanted spikes are between 45° and 80° to said grid.

4. The combination of claim 1 wherein:

said long spikes are at substantially right angles to said grid; and said slanted spikes are between 45° and 80° to said grid.

* * * * *